United States Patent [19]

Wieland

[11] 4,236,448

[45] Dec. 2, 1980

[54] VIBRATION DAMPING MECHANISM IN A ROTARY PRINTING PRESS

[75] Inventor: Erich G. Wieland, Wurzburg, Fed. Rep. of Germany

[73] Assignee: Koenig & Bauer Aktiengesellschaft, Wurzburg, Fed. Rep. of Germany

[21] Appl. No.: 57,550

[22] Filed: Jul. 13, 1979

[30] Foreign Application Priority Data

Aug. 17, 1978 [DE] Fed. Rep. of Germany ....... 2835960

[51] Int. Cl.[3] .......................... B41F 5/00; F16G 1/26; B41F 13/00

[52] U.S. Cl. .................................... 101/216; 101/248; 74/203; 74/409; 474/84; 474/150

[58] Field of Search ............... 101/212, 213, 216, 217, 101/248, DIG. 12; 74/202, 203, 206, 231 MB, 409, 413

[56] References Cited

U.S. PATENT DOCUMENTS

| | | | |
|---|---|---|---|
| 1,107,731 | 8/1914 | Vold | 74/409 X |
| 2,299,486 | 10/1942 | Miller | 74/203 X |
| 3,037,396 | 6/1962 | Martin | 101/248 X |
| 3,364,760 | 1/1968 | Bugg | 74/206 |
| 3,548,673 | 12/1970 | Sucholki | 74/409 |
| 3,732,815 | 5/1973 | Greiner et al. | 101/216 X |
| 3,995,506 | 12/1976 | Poe | 74/231 MB |

FOREIGN PATENT DOCUMENTS

| | | | |
|---|---|---|---|
| 2334177 | 1/1975 | Fed. Rep. of Germany | 101/216 |
| 2447602 | 4/1976 | Fed. Rep. of Germany | 101/216 |
| 4065 | 10/1891 | France | 74/203 |

*Primary Examiner*—E. H. Eickholt
*Attorney, Agent, or Firm*—Jones, Tullar & Cooper

[57] ABSTRACT

A mechanism for damping vibration in the gear drive of a rotary printing press is disclosed. The various gear driven elements such as transfer cylinders, forme cylinders and blanket cylinders carry belt pulleys with the pulleys being connected by suitable belts. The sizes of the pulleys are selected and sized to attempt to drive the various cylinders at a speed less than the speed provided by the gear drive. In this way the gear drive is not allowed to chatter or vibrate. The orientation of the drive belts is selected to conform with the number of gears in a particular gear drive assembly.

7 Claims, 2 Drawing Figures

VIBRATION DAMPING MECHANISM IN A ROTARY PRINTING PRESS

FIELD OF THE INVENTION

The present invention is directed generally to a mechanism for damping vibrations in the gear drive of a rotary printing machine. More particularly, the present invention is directed to a vibration damping assembly using belts and pulleys. Most specifically, the present invention is directed to a vibration damping arrangement in which the belts and pulleys are selected and sized to run at a speed lower than the speed provided by the gear drive.

The various cylinders in the printing press are gear driven and are provided with belt pulleys and drive belts. These belts act essentially as brakes or frictional elements to ensure that the gear teeth of the gear drive elements firmly contact each other to eliminate vibration in the printing press.

DESCRIPTION OF THE PRIOR ART

Vibration damping mechanisms for use in rotary printing presses are known generally in the prior art, as may be seen, for example, in German Unexamined Application No. 24 47 602, in which guide disks are provided, next to the gears, with these disks being in contact with each other, one of the disks having a hard sliding surface, and the other disk having an elastic or resilient sliding surface.

A disadvantage of this prior vibration dampening is that the small operating surface of contact between the two disks must take both tangential forces and frictional operation. The frictional operation on the contact surface causes heat build up and possible loosening and slippage of the elastic coating. If the distance increases, as is the case particularly in sheetfed rotary printing presses; i.e., when the backlash between two gears in engagement with each other increases, the tangential force transferable by means of friction between the two disks decreases. However, in this position, it would be preferable for the tangential force transferable by means of friction to be maintained or even increased. Furthermore, the revolving ratio between the hard roller and the elastic roller will vary due to the visco-elastic behavior of the elastic coating on the elastic roller. Thus, the prior art mechanism for vibration damping has not been particularly satisfactory and has not resolved the problems of vibration which cause printing errors and faults.

SUMMARY OF THE INVENTION

It is an object of the present invention to provide a vibration damping mechanism in a rotary printing press.

A further object of the present invention is to provide a damping mechanism utilizing belt pulleys and belts.

Yet another object of the present invention is to provide a damping assembly which does not interfere with the operation of the printing press.

Still an additional object of the present invention is to provide a vibration damping mechanism that is effective and dependable.

In accordance with the present invention, there is provided a mechanism for damping vibrations in the gear drive of a rotary printing press in which at least two gears with a certain speed ratio form a partial gear train. At least one power input gear and one power output gear of the partial gear train each have a belt pulley secured thereto. The belt pulley secured to the power input gear forms, together with the belt pulley secured to the power output gear, a belt drive acting in the proper direction of rotation through a drive belt passing between the two pulleys. The speed ratio of the belt drive is smaller than the speed ratio of the partial gear train.

The advantages which are afforded by the present invention relate particularly to being a relatively large contact surface which can take up the tangential forces and the frictional operation. Any heating of the drive belt resulting from frictional forces has no negative results. No detrimental effect on the vibration damping behavior of the mechanism will be caused from an increase of the distance of the axles in the mechanism. A further advantage of the mechanism in accordance with the present invention is that any possibly worn-out part may easily be replaced and that the mechanism has a long life-time.

BRIEF DESCRIPTION OF THE DRAWINGS

While the patentable features of the vibration damping mechanism in accordance with the present invention are set forth with particularity in the appended claims, a full and complete understanding of the invention may be had by referring to the description of a preferred embodiment as set forth hereinafter and as may be seen in the accompanying drawings in which:

DESCRIPTION OF A PREFERRED EMBODIMENT

Figure 1:
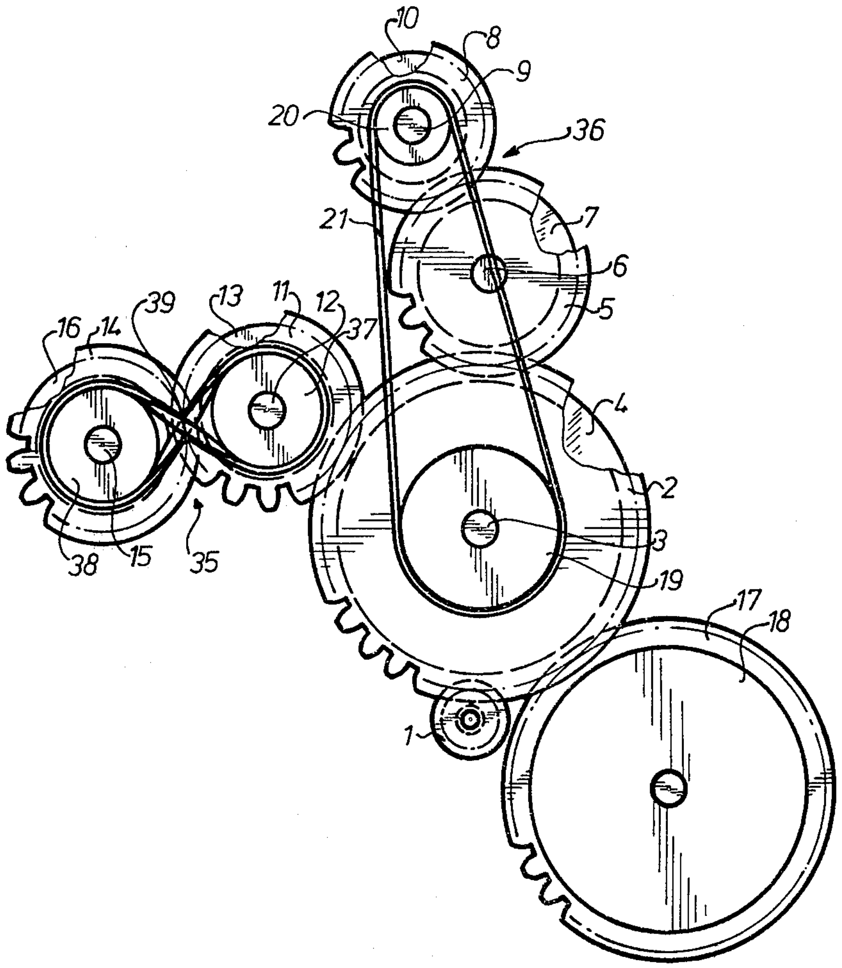
FIG. 1 is a schematic side view of a printing unit of a rotary printing press and showing the vibration damping mechanism of the present invention.

Turning now to FIG. 1, there may be seen in the arrangement of a gear train for a printing unit of a sheetfed offset rotary printing press having two printing elements 35 and 36. Drive of the printing unit is effected by means of a pinion 1 which is driven by the main motor of the press, the pinion 1 meshing with a spur gear 2, which is secured to a cylinder shaft 3 of a counter-pressure cylinder 4. A spur gear 5 meshes with the spur gear 2, with spur gear 5 being secured to a cylinder shaft 6 of a blanket cylinder 7. The spur gear 5 meshes with a spur gear 8, which is secured to a cylinder shaft 9 of a forme cylinder 10.

As also seen in FIG. 1, a spur gear 11 meshes with the spur gear 2, the spur gear 11 being rigidly secured to a cylinder shaft 12 of a blanket cylinder 13. A spur gear 14 meshes with the spur gear 11, spur gear 14 being wedged upon a cylinder shaft 15 of a forme cylinder 16. The spur gear 2 also meshes with a spur gear 17 of a transfer drum 18. This gear drive arrangement is generally known in the art and is meant to be exemplary of any known gear drive arrangement for use in driving the various cylinders in a rotary printing press. The spur gears 2, 5 and 8 form a three axle gear train having a total speed ratio to the direction of power flow $i_Z$.

A belt pulley 19 is also wedged or secured onto shaft 3 together with spur gear 2, as may also be seen in FIG. 1, and a belt pulley 20 is secured on cylinder shaft 9. Belt pulley 19 and belt pulley 20 are joined together by a flat or V-belt 21 and are of a pre-selected size so that their speed ratio $i_T$, is smaller than the speed ratio $i_z$, of the corresponding gear train drive comprised of spur gears 2, 5 and 8. Because belt pulley 19 will be driven with cylinder 4 by pinion 1 and further since the belt 21 will tend to drive forme cylinder 10 at a slower speed than the speed imparted through the drive gears, the belt drive will tend to exert pressure on the drive gearing. This pressure or force will cause the gear teeth to remain in contact with each other so there will not be vibration in the gear drive mechanism for the printing press.

Similar belt pulleys 37 and 38 are secured to shafts 12 and 15 of cylinders 13 and 16 respectively. The pulleys are connected by a suitable flat or V-belt 39 and thus speed ratio $i_{T2}$ is smaller than the speed ratio $i_{Z2}$ provided by the spur gears 11 and 14. Again, the difference in speed ratios causes the belt pulleys and drive belt to act as a brake or a frictional assembly to keep the teeth of the spur gears 11 and 14 in contact so that vibration is prevented. The belts 21 and 39 will slip in their respective pulleys but this slippage has no adverse effect and any heat generated is quickly dissipated.

Belt 21 passes between two cylinders 4 and 10 which both cooperate with an intermediate cylinder 17. Accordingly, belt 21 can be an open drive belt since the number of spur gears is odd. In contrast, belt 39, which connects a two gear arrangement, must be in a crossing arrangement so that the belt drive and the gear drive both cause rotation of the driven cylinder in the same direction although at differing speeds. These two drive belt orientations are both shown in FIG. 1.

Figure 2:
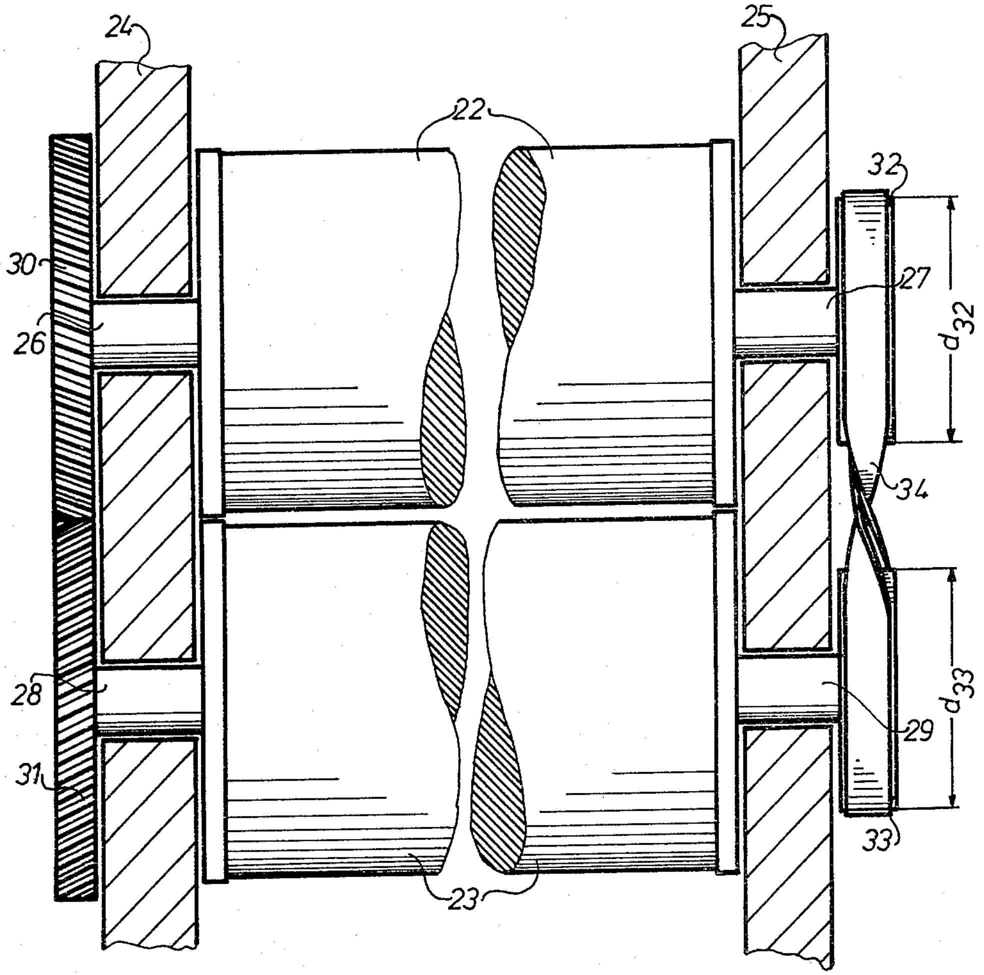
FIG. 2 is a schematic view, partly in section, of a transfer drum assembly of a rotary printing press and showing the vibration damping mechanism of the present invention.

A similar vibration damping arrangement is shown in FIG. 2 in use with a transfer drum 22 and a cooperating take-over drum 23. Drum 22 is supported in side frames 24 and 25 by shafts 26 and 27 and drum 23 is supported by shafts 28 and 29. A spur gear 30 is secured to shaft 26 of transfer drum 22 and a meshing spur gear 31 is secured to shaft 28 of take-over drum 23. A belt pulley 32 is carried by shaft 27 of drum 22 and a belt pulley 33 is positioned on shaft 29 of take-over drum 23. These belt pulleys are of a suitable size so that when they are connected by a belt 34, their speed ratio $i_{T3}$ is less than the speed ratio $i_{Z3}$ of the spur gears 30 and 31. Therefore, the belt 34 and pulleys 32 and 33 again act as a vibration damping means. As was the situation with the two gear arrangement of FIG. 1, the belt 34 of FIG. 2 must be crossed so that both the belt drive and the spur gear drive work in the same direction. The diameter of the belt pulleys 32 and 33 are shown as d32 and d33 in FIG. 2 and, as was previously discussed, these diameters are selected so that the speed imparted by belt 34 is less than that caused by the spur gears.

While the vibration damping mechanism has been hereinabove described for use with a sheet-fed rotary printing press, it will be obvious that this mechanism could be used in other printing machines and in other machines generally. Further, it will be obvious to one of skill in the art that a number of changes in for example, the type of belt used, the shape of the belt pulleys, the arrangement of drive gears and the like could be made without departing from the true spirit and scope of the invention and that the invention is to be limited only by the appended claims.

I claim:

1. A vibration damping assembly for damping vibration in a gear drive of a rotary printing press, the printing press having at least first and second rotating cylinders, each of the cylinders having a gear secured thereto, the gear carried by each cylinder being in engagement with the gear of an adjacent cylinder to form the gear drive of the printing press, to drive the cylinders at a first speed ratio, the vibration damping assembly comprising:

a first belt pulley secured to the first cylinder;

a second belt pulley secured to the second cylinder; and a drive belt connecting said first and second belt pulleys, said first and second belt pulleys being of a size to have a speed ratio less than the speed ratio of the corresponding cylinders.

2. The assembly of claim 1 wherein the rotary printing press includes a third cylinder carrying a third gear, the third cylinder being positioned between the first and second cylinders with the third gear meshing with the first and second gears, said drive belt extending between the first and second cylinders and being out of contact with the third cylinder.

3. The assembly of claim 1 wherein said drive belt is crossed.

4. The assembly of claim 2 wherein said drive belt is open.

5. The assembly of claim 1 wherein said drive belt is flat.

6. The assembly of claim 1 wherein said belt is a V-belt.

7. The assembly of claim 1 wherein the first cylinder is driven by a pinion gear.

* * * * *